United States Patent
Li et al.

(10) Patent No.: US 11,533,085 B2
(45) Date of Patent: Dec. 20, 2022

(54) METHOD, DEVICE AND COMPUTER READABLE MEDIUM FOR POWER ALLOCATION FOR MU-MIMO

(71) Applicant: NOKIA SOLUTIONS AND NETWORKS OY, Espoo (FI)

(72) Inventors: Wenhui Li, Zhejiang (CN); Guowei Zeng, Zhejiang (CN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 17/288,219

(22) PCT Filed: Nov. 15, 2018

(86) PCT No.: PCT/CN2018/115690
§ 371 (c)(1),
(2) Date: Apr. 23, 2021

(87) PCT Pub. No.: WO2020/097866
PCT Pub. Date: May 22, 2020

(65) Prior Publication Data
US 2021/0399772 A1   Dec. 23, 2021

(51) Int. Cl.
*H04L 23/02* (2006.01)
*H04B 7/0452* (2017.01)
(Continued)

(52) U.S. Cl.
CPC .......... *H04B 7/0452* (2013.01); *H04B 7/005* (2013.01); *H04W 72/0486* (2013.01)

(58) Field of Classification Search
CPC ..... H04L 1/0054; H04L 1/005; H04L 5/0037; H04L 5/0091; H04L 5/0007;
(Continued)

(56) References Cited

U.S. PATENT DOCUMENTS

2009/0318183 A1    12/2009  Hugl et al.
2018/0234277 A1*    8/2018  Akkarakaran ........ H04L 5/0073
(Continued)

FOREIGN PATENT DOCUMENTS

CN    101437011 A    5/2009
CN    106465365 A    2/2017
(Continued)

OTHER PUBLICATIONS

International Search Report and Written Opinion dated Aug. 15, 2019 corresponding to International Patent Application No. PCT/CN2018/115690.
(Continued)

*Primary Examiner* — Khai Tran
(74) *Attorney, Agent, or Firm* — Squire Patton Boggs (US) LLP

(57) ABSTRACT

Embodiments of the present disclosure provide methods, devices and computer readable media for communication. In a method implemented at a network device, the method comprising allocating, at a network device, available resource block groups RBGs to a plurality of terminal devices; determining the number of shared RBGs in the available RBGs, the shared RBGs being shared by the plurality of terminal devices; determining a sum of shared number of the shared RBGs per each of the plurality of terminal devices; determining an average value of the transmit power base on the number of available RBGs and a total power of the network device, the average value indicating a basic power allocated by the network device to the plurality of terminal devices; determining an offset value of a transmit power for each of the plurality of terminal devices based on the number of shared RBGs, the sum of the shared number and the average value; and determining a target value of the
(Continued)

transmit power for each of the plurality of terminal devices based on the offset value and the average value.

12 Claims, 3 Drawing Sheets

(51) Int. Cl.
*H04B 7/005* (2006.01)
*H04W 72/04* (2009.01)

(58) Field of Classification Search
CPC ............... H04B 7/0695; H04B 7/0452; H04W 16/28; H04W 72/04; H04W 52/143; H04W 52/346
USPC .......................................... 375/262, 260, 267
See application file for complete search history.

(56) References Cited

U.S. PATENT DOCUMENTS

2018/0324853 A1    11/2018  Jeon et al.
2019/0387377 A1*   12/2019  Zhang ................. H04W 52/383

FOREIGN PATENT DOCUMENTS

| CN | 108347776 A | 7/2018 |
| EP | 2983406 A1 | 2/2016 |

OTHER PUBLICATIONS

Extended European Search Report corresponding to European Application No. 18939938.9, dated May 24, 2022.

* cited by examiner

METHOD, DEVICE AND COMPUTER READABLE MEDIUM FOR POWER ALLOCATION FOR MU-MIMO

FIELD

Embodiments of the present disclosure generally relate to the field of telecommunication, and in particular, to methods, devices and computer readable storage media for power allocation for Multi User Multiple Input Multiple Output (MU MIMO).

BACKGROUND

A base station is a power limited system. For the Base Transceiver Station (BTS), the transmit power toward each UE can be different or same. Generally, in Multi User Multiple Input Multiple Output (MU MIMO), higher transmit power to a UE will result in higher receive power in UE side, and therefore higher interference to other UEs. In order to achieve better coverage and the receive gain of UE over the cell, how to allocate power among UEs is important.

The legacy power allocation in LTE and 5G is in static mode. The total Downlink Transmit (DL TX) power is equally split to all component carriers and the power within one component carrier is equally split to all REs. The power of each RE was shared by N UEs if it's multiplexed for N times. The total DL TX power for all component carriers is controlled by an operator configurable parameter. However, for MU MIMO, this static power allocation will cause unflatten spectral density of UE Receive (RX) power, which will lead to low frequency efficiency and low throughput.

SUMMARY

In general, example embodiments of the present disclosure provide methods, devices and computer readable media for communication, in particular, for power allocation for MU MIMO.

In a first aspect, there is provided a method implemented at a network device. The method comprises comprising allocating, at a network device, available resource block groups RBGs to a plurality of terminal devices; determining the number of shared RBGs in the available RBGs, the shared RBGs being shared by the plurality of terminal devices; determining a sum of shared number of the shared RBGs per each of the plurality of terminal devices; determining an average value of the transmit power base on the number of available RBGs and a total power of the network device, the average value indicating a basic power allocated by the network device to the plurality of terminal devices; determining an offset value of a transmit power for each of the plurality of terminal devices based on the number of shared RBGs, the sum of the shared number and the average value; and determining a target value of the transmit power for each of the plurality of terminal devices based on the offset value and the average value.

In a second aspect, there is provided a network device. The device comprises at least one processor; and at least one memory including computer program codes. The at least one memory and the computer program codes are configured to, with the at least one processor, cause the device at least to perform the method according to the first aspect.

In a third aspect, there is provided an apparatus comprising means to perform the steps of the method according to the first aspect.

In a fourth aspect, there is provided a computer readable medium having a computer program stored thereon which, when executed by at least one processor of a device, causes the device to carry out the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION

Figure 1:
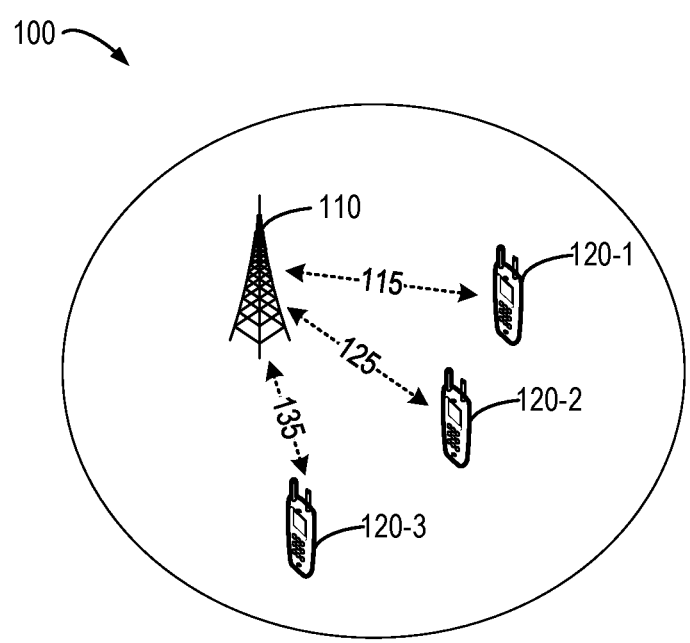
FIG. 1 shows an example communication system 100 in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, In some example embodiments, the LTE network, the LTE-A network, the 5G NR network or any combination thereof is taken as an example of the communication network.

As used herein, the term "device" may refer to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, In some example embodiments, the eNB is taken as an example of the network device.

The device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "device" may also refer to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some example embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 is a schematic diagram of a communication environment 100 in which embodiments of the present disclosure can be implemented. The communication environment 100 may comprise a network device 110, which provides wireless connections for a plurality of terminal devices 120-1, 120-2 and 120-3 (hereinafter collectively referred to as terminal devices 120 or UEs 120) within its coverage. The terminal devices 120-1, 120-2 and 120-3 may communicate with the network device 110 via wireless transmission channels 115, 125, and 135, respectively. Additionally, the terminal devices 120-1, 120-2 and 120-3 may communicate with each other via device-to-device (D2D) links (not shown in FIG. 1).

It is to be understood that the number of network devices and the number of terminal devices as shown in FIG. 1 are only for the purpose of illustration without suggesting any limitations. The communication environment 100 may include any suitable number of network devices and any suitable number of terminal devices adapted for implementing embodiments of the present disclosure. In addition, it would be appreciated that there may be various wireless communications as well as wireline communications (if needed) among these additional network devices and additional terminal devices.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like.

Furthermore, the communications in the communication environment 100 may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

By way of illustrative example, the various example implementations or techniques described herein may be applied to various terminal devices, such as machine type communication (MTC) terminal devices, enhanced machine type communication (eMTC) terminal devices, Internet of Things (IoT) terminal devices, and/or narrowband IoT terminal devices.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, for example, when an event occurs. Machine Type Communications (MTC, or Machine to Machine communications) may, for example, be characterized by fully automatic data generation, exchange, processing and actuation among intelligent machines, with or without intervention of humans.

Also, in an example implementation, a terminal device or UE may be a UE/terminal device with URLLC applications. A cell (or cells) may include a number of terminal devices connected to the cell, including terminal devices of different types or different categories, for example, including the categories of MTC, NB-IoT, URLLC, or other UE category.

The various example implementations may be applied to a wide variety of wireless technologies or wireless networks, such as LTE, LTE-A, 5G, cmWave, and/or mmWave band networks, IoT, MTC, eMTC, URLLC, and the like, or any other wireless network or wireless technology. These example networks or technologies are provided only as illustrative examples, and the various example implementations may be applied to any wireless technology/wireless network.

As mentioned above, in a MU MIMO communication environment, as shown in FIG. 1, if higher transmit power is allocated to one of the terminal devices 120, for example, the terminal device 120-1, the terminal device 120-1 will have a higher receive power, which may lead to a higher interference to other terminal devices, namely, terminal 120-2 and 120-3.

In LTE or 5G, the legacy power allocation is in static mode. The total Downlink Transmit (DL TX) power is equally split to all component carriers and the power within one component carrier is equally split to all REs. The power of each RE was shared by N UEs if it's multiplexed for N times. The total DL TX power for all component carriers is controlled by an operator configurable parameter. The power per component carrier $P_{cc}$ in dBm is calculated according to the following equation (1):

$$P_{CC}=[PA-10\ \log(\text{number of Component Carriers})]/N\ (\text{dBm}) \quad (1)$$

Where PA (dBm) defines the total power budget over all component carriers (per antenna port). In 5G18A, PA is defined as NRCELLGRP: powerBudgetPerAnt.

MU-MIMO will cause significant power difference ranged from 1/numOfLayer~1 according the number of paired layers. An example of massive MIMO support maximum 16 layers, it's mean the power range distributed from 1/16~1 for the same UE on different PRB.

Shannon's theorem reveals that bigger SINR resulting in higher channel capacity. Since the power on each PRB is significantly different, the channel capacity is significantly different at PRB level per UE. But code rate per UE is the same at different PRB and the total channel capacity depends on all allocated PRBs, which means the smallest SINR PRB will limit the whole capacity of each UE.

As a legacy scheme for power allocation, the MU-MIMO will re-use frequency resource N times according to schedule result and N is different at different RBG position. The power of RBG is factored with 1/N. For example, if a frequency resource, for example RBG[0], is reused by terminal devices 120-1 and 120-2, as shown in FIG. 1, then the power of RBG[0] is factored with ½. If another frequency resource, for example RBG[1], is reused by terminal devices 120-1, 120-2 and 120-3, as shown in FIG. 1, then the power of RBG[1] is factored with ⅓. Therefore, the power spectral density of terminal devices will be bumpiness. It will cause un-flat SINR and lower de-modulation performance, resulting in lower system throughput.

Thus, the embodiments of the present invention proposed a method for power allocation for multi-user UEs.

Principle and implementations of the present disclosure will be described in detail below with reference to FIG. 2, which shows a flowchart of an example method 200 for power allocation for multi-user UEs according to some example embodiments of the present disclosure. The method 200 can be implemented at the network device 110 as shown in FIG. 1. For the purpose of discussion, the method 200 will be described with reference to FIG. 1.

In MU MIMO, one RBG can be allocated to multi UEs (for example, terminal devices 120-1, 120-2 and 120-3) and be shared by these terminal devices. As used herein, the term "RBG" may refer to as the basic frequency resource allocate unit for the terminal devices 120. RBG may be used to donate the frequency resource.

Figure 2:
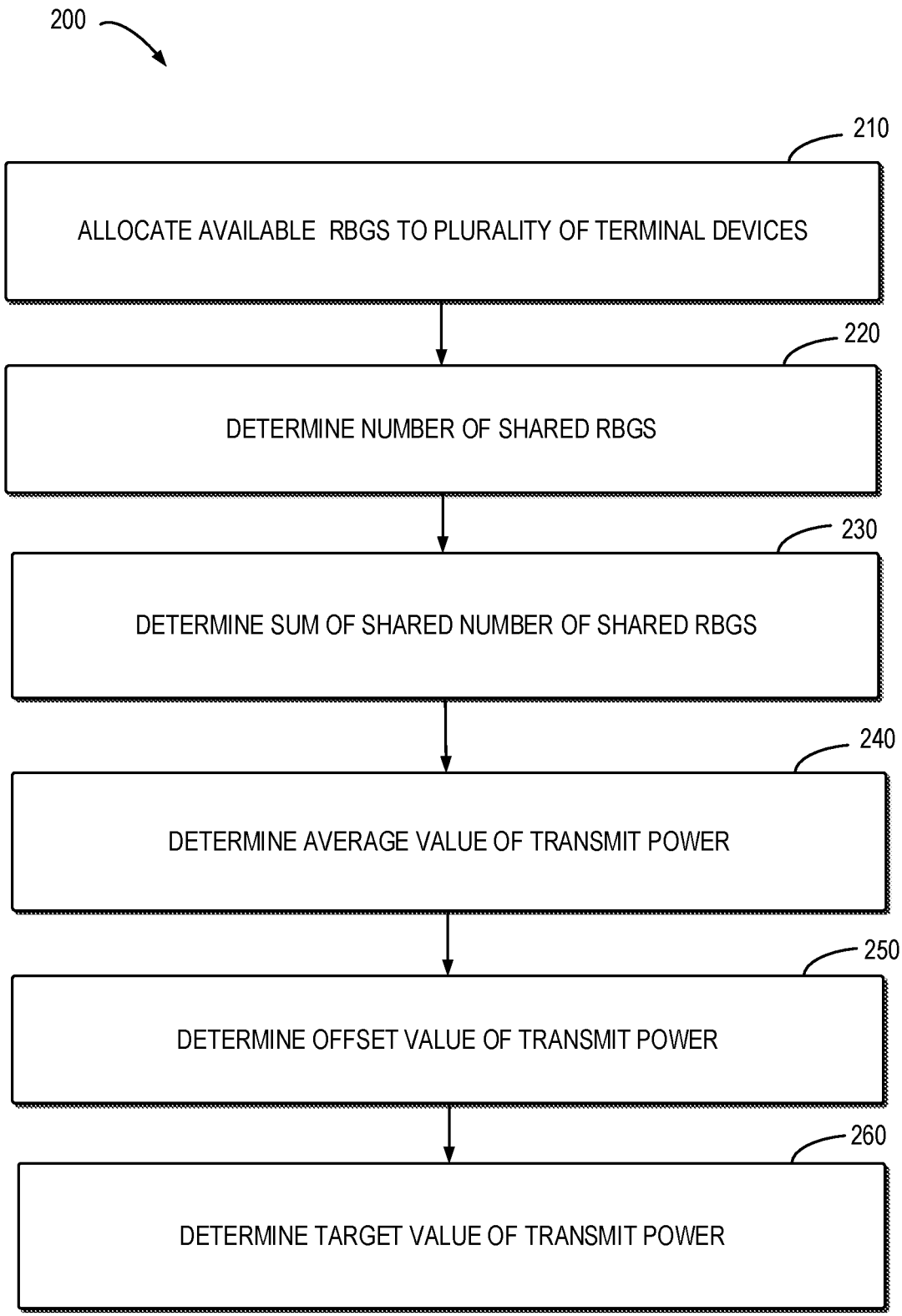
FIG. 2 shows a flowchart of an example method 200 for interleaving pattern based NOMA technology according to some example embodiments of the present disclosure.

As shown in FIG. 2, at 210, the network device 110 allocates available resource block groups (RBGs) to a plurality of terminal devices (for example terminal device 120-1 and 120-2 as shown in FIG. 1). The number of the available RBGs may be determined, for example, based on the frequency bandwidth of the system.

At 220, the network device 110 determines the number of shared RBGs in available RBGs. The shared RBGs are shared by a plurality of terminal devices.

In some example embodiments, the network device 110 may determine the indices of unshared RBGs allocated from the available RBGs to a further terminal device and indices of unallocated RBGs from the available RBGs. The unshared RBGs may be considered as the RBGs only allocated to one single terminal device (for example, terminal device 120-3 as shown in FIG. 1). The unallocated RBGs may be considered as the RBGs have not been allocated to the terminal devices. The network device 110 may further determine the indices of the shared RBGs based on the number of the available RBGs, the indices of unshared RBGs allocated to the further terminal device and the indices of unallocated RBGs and determine the number of the shared RBGs based on the indices of the shared RBGs.

At 230, the network device 110 determines a sum of shared number of the shared RBGs per each of the plurality of terminal devices.

In some example embodiments, if the indices of the shared RBGs is determined, the network device 110 may further determine the sum of shared number of the shared RBGs based on the indices of the shared RBGs. For example, the first RBG and the second RBG are the shared RBGs in all available RBGs. If the first RBG is shared by the terminal device 120-1 and the terminal 120-2, then the shared number of the first RBG is 2. If the second RBG is also shared by the terminal device 120-1 and the terminal 120-2, the shared number of the first RBG is 2. Thus, the sum of the shared number equals to 4 (2+2). The sum of the shared number may also be represented as a total shared number of the shared RBGs.

At 240, the network device 110 determines an average value of the transmit power base on the number of available RBGs and a total power of the network device. The average value indicates a basic power allocated by the network device to the plurality of terminal devices. That is to say, for each unshared RBG, its power value equals to the average value.

At 250, the network device 110 determines an offset value of a transmit power for each of the plurality of terminal devices based on the number of shared RBGs, the sum of the shared number and the average value. As used herein, the term "offset value" may be considered as the power value offset from the average value. For each shared RBG, its power value may not be equal to the average value, because it has been multiplexed for more than one UE. As described above, in order to balance the power spectral density of terminal devices, the offset value of transmit power is proposed to adjust the power spectral density of terminal devices.

In some example embodiments, the network device 110 may determine the offset value of the power based on a ratio of the number of the shared RBGs to the sum of the shared number.

The allocation of RBGs for each terminal device may be shown in Table 1 as follow. RBG [2] and RBG [3] are allocated to the terminal device 120-1, RBG [2], RBG [3] and RBG [4] are allocated to the terminal device 120-2 and RBG [5], RBG [6], RBG [7] and RBG [8].

The network device 110 may determine the indices of unshared RBGs, namely RBG [5], RBG [6], RBG [7] and RBG [8] and the indices of unallocated RBGs, namely RBG [0]-RBG [1] and RBG [9]-RBG [16].

Thus, the indices of the shared RBGs may be determined by the total RBG number, the indices of unshared RBGs and the indices of unallocated RBGs. That is, the indices of the shared RBGs are RBG [2], RBG [3] and RBG [4] and therefore the number of the shared RBGs may be determined. In this case, the number of the shared RBGs is 17−4−10=3.

TABLE 1

The allocation of RBGs for each terminal device

| RBG Index | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Terminal device 120-1 | | | used | used | | | | | | | | | | | | | |
| Terminal device 120-2 | | | used | used | used | | | | | | | | | | | | |
| Terminal device 120-3 | | | | | | used | used | used | used | | | | | | | | |

As shown in FIG. 2, at 260, the network device 110 determines a target value of the transmit power for each of the plurality of terminal devices based on the offset value and the average value.

In some example embodiments, the network device 110 may further perform communication with the plurality of the terminal devices at the target value of the transmit power. That is, the network device 110 may transmit the signal to the plurality of the terminal devices with the transmit power at the level of the target value. In this way, the network device does not need inform the transmit power to the terminal devices. The network device may apply the transmit power on antennas directly. The calculation and using of the power is no delay and reflect on the network device transmit signal power at once.

Furthermore, by means of the method described as above, the network device may achieve a real-time power control at Transmission Time Interval (TTI).

As described above, the power allocation method for multiple users in MU MIMO of the embodiments of the present disclosure has been described in detail with reference to FIG. 2. This method will be further explained by an example in the following. The method 200 can be implemented at the network device 110 as shown in FIG. 1. For the purpose of discussion, the method 200 will be described with reference to FIG. 1.

There are three terminal devices 120-1, 120-2 and 120-3 scheduled by the network device 110. Based on the frequency bandwidth, the network device 110 determines the total RBG number of frequency bandwidth is N=17. The network device 110 allocates those RBGs to the terminal devices 120-1, 120-2 and 120-3.

The network deice 110 may further determine the shared number of shared RBG per each MU UE. As shown in table 1, for RBG [2] and RBG [3], terminal devices 120-1 and 120-2 share those RBGs. Thus, for RBG [2] and RBG [3], the numbers of terminal devices sharing RBG [2] and RBG [3] are both 2. For RBG [4], only terminal device 120-1 uses this RBG, the number of terminal devices sharing the RBG [4] is 1.

The network deice 110 may determine the value of the transmit power for the terminal device 120-1 and 120-2 based on the following Equation (2):

$$txPower = P + 10\log\left(\frac{muUeRbgSum}{\sum_{i=0}^{N-1} shareUeNumOfRbg[i]}\right) \quad (2)$$

where P is the reference value of the transmit power for the terminal device and $$10\log\left(\frac{muUeRbgSum}{\sum_{i=0}^{N-1} shareUeNumOfRbg[i]}\right)$$

is offset value of a transmit power for each terminal device 120-1 and 120-2.

For the case shown in Table 1, the value of the transmit power for the terminal device 120-1 and 120-2 is $$P + 10\log\left(\frac{3}{2+2+1}\right) = P + 10\log\left(\frac{3}{5}\right)(\text{dbm}).$$

For the terminal device 120-3, i.e. the single terminal device, the value of the transmit power is txPower=P(dbm).

In this way, this new power allocation methodology will adjust power between PRBs after it's paired at TTI level. All power allocating to multi-user paired UEs can be considered as a pool. Then power is uniformly distributed to PRBs for each UE, each layer and each PRB. The TX Power spectral density of each UE is flattened over all MU UEs and all RBGs on TTI level. Furthermore, an improve massive MIMO transmit performance through real-time power allocation is achieved.

Figure 3:
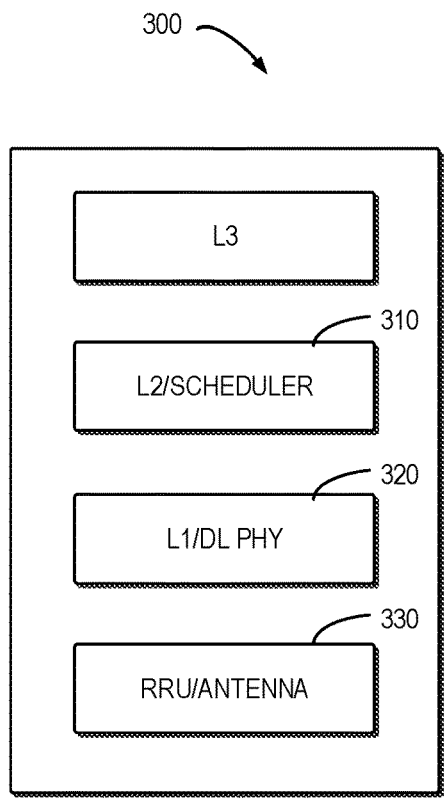
FIG. 3 shows an example for power allocation for MU MIMO according to some example embodiments of the present disclosure.

FIG. 3 shows an example for power allocation for multi-user UEs according to some example embodiments of the present disclosure.

In a BTS 300 shown in FIG. 3, which can be consider as the network device 110 in FIG. 1, the L2/Scheduler module 310 is response for frequency resource allocation for each UEs. The txPower of each scheduled UE is calculated based on the allocated frequency resource. The L1/DL PHY module 320 applies txPower to the transmit data for the UE. The UE's receive signal power is dependent on the BTS transmit power, which is controlled by txPower. The antenna module 330 is configured to transmit the signal to UEs.

With the balanced power allocation method, balanced signal-to-interference ratio is achieved. System level simulation shows that it's has more than 10% average cell throughput gain comparing with the legacy unbalanced power allocation method. The comparing result is shown in Table 2.

| Power Allocation Scheme | | Legacy | Optimized |
|---|---|---|---|
| # users per PRB | | 2.12 | 2.21 |
| # layers per PRB | | 3.52 | 3.73 |
| Average cell throughput (Mb/s) | | 34.17 | 37.62 |
| | | | (+10%) |
| Full buffer | Average user throughput (kb/s) | 2907 | 3107 |
| | | | (+7%) |
| | Cell-edge user throughput (kb/s) | 35 | 50 |
| | | | (+4.3%) |
| Small data package | Average packet throughput (kb/s) | 404 | 404 |
| | | | (+0%) |
| | Cell-edge packet throughput (kb/s) | 70 | 67 |
| | | | (−4%) |

As shown in Table, an important use case of this new power allocation method is massive MIMO in LTE. Lots of MU MIMO is involved in massive MIMO and significant throughput improvement is achieved.

In some example embodiments, an apparatus capable of performing the method 200 (for example, the network device) may comprise means for performing the respective steps of the method 200. The means may be implemented in any suitable form. For example, the means may be implemented in a circuitry or software module.

In some example embodiments, the apparatus comprises: means for allocating, at a network device, available resource block groups RBGs to a plurality of terminal devices; means for determining the number of shared RBGs in the available RBGs, the shared RBGs being shared by the plurality of terminal devices; means for determining a sum of shared number of the shared RBGs per each of the plurality of terminal devices; means for determining an average value of the transmit power base on the number of available RBGs and a total power of the network device, the average value indicating a basic power allocated by the network device to the plurality of terminal devices; means for determining an offset value of a transmit power for each of the plurality of terminal devices based on the number of shared RBGs, the sum of the shared number and the average value; and means for determining a target value of the transmit power for each of the plurality of terminal devices based on the offset value and the average value.

In some example embodiments, the means for determining the number of the shared RBGs may comprise means for determining indices of unshared RBGs allocated from the available RBGs to a further terminal device; means for determining indices of unallocated RBGs from the available RBGs; means for determining indices of the shared RBGs based on the number of the available RBGs, the indices of unshared RBGs allocated to the further terminal device and the indices of unallocated RBGs; and means for determining the number of the shared RBGs based on the indices of the shared RBGs.

In some example embodiments, the means for determining the number of the shared RBGs may comprise means for determining indices of unshared RBGs allocated from the available RBGs to a further terminal device; means for determining indices of unallocated RBGs from the available RBGs; means for determining indices of the shared RBGs based on the number of the available RBGs, the indices of unshared RBGs allocated to the further terminal device and the indices of unallocated RBGs; and means for the sum of shared number of the shared RBGs based on the indices of the shared RBGs.

In some example embodiments, the means for determining the offset value of the power comprises means for determining the offset value of the power based on a ratio of the number of the shared RBGs to the sum of shared number of the shared RBGs.

In some example embodiments, the apparatus may further comprise means for performing communication with the plurality of the terminal devices at the target value of the transmit power.

Figure 4:
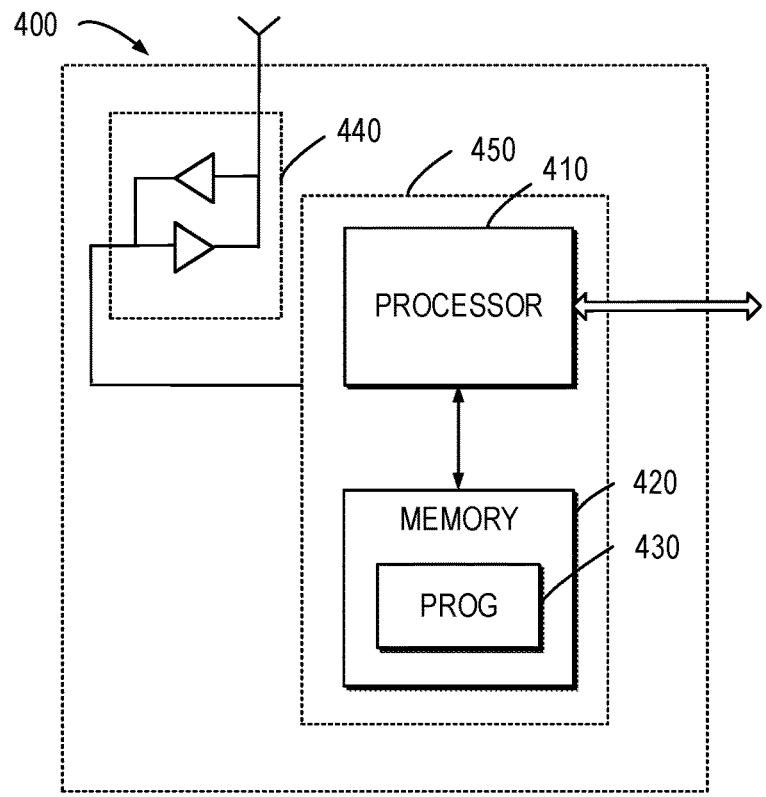
FIG. 4 is a simplified block diagram of a device that is suitable for implementing example embodiments of the present disclosure.

FIG. 4 is a simplified block diagram of a device 400 that is suitable for implementing example embodiments of the present disclosure. The device 400 can be considered as a further example implementation of the network device 110 as shown in FIG. 1.

As shown, the device 400 includes a processor 410, a memory 420 coupled to the processor 410, a suitable transmitter (TX) and receiver (RX) 440 coupled to the processor 410, and a communication interface coupled to the TX/RX 440. The memory 410 stores at least a part of a program 430. The TX/RX 440 is for bidirectional communications. The TX/RX 440 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 430 is assumed to include program instructions that, when executed by the associated processor 410, enable the device 400 to operate in accordance with the example embodiments of the present disclosure, as discussed herein with reference to FIGS. 2 to 3. The example embodiments herein may be implemented by computer software executable by the processor 410 of the device 400, or by hardware, or by a combination of software and hardware. The processor 410 may be configured to implement various example embodiments of the present disclosure. Furthermore, a combination of the processor 410 and memory 410 may form processing means 450 adapted to implement various example embodiments of the present disclosure.

The memory 410 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 410 is shown in the device 400, there may be several physically distinct memory modules in the device 400. The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 to 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for transmit power allocation in an MU MIMO system, comprising:
   allocating, at a network device, available resource block groups RBGs to a plurality of terminal devices;
   determining a number of shared RBGs in the available RBGs, the shared RBGs being shared by the plurality of terminal devices;
   determining a sum of the shared number of the shared RBGs per each of the plurality of terminal devices;
   determining an average value of the transmit power base on the number of available RBGs and a total power of the network device, the average value indicating a basic power allocated by the network device to the plurality of terminal devices;

determining an offset value of the transmit power for each of the plurality of terminal devices based on the number of shared RBGs, the sum of the shared number and the average value; and
determining a target value of the transmit power for each of the plurality of terminal devices based on the offset value and the average value.

2. The method of claim 1, wherein determining the number of the shared RBGs comprises:
determining indices of unshared RBGs allocated from the available RBGs to a further terminal device;
determining indices of unallocated RBGs from the available RBGs;
determining indices of the shared RBGs based on the number of the available RBGs, the indices of unshared RBGs allocated to the further terminal device and the indices of unallocated RBGs; and
determining the number of the shared RBGs based on the indices of the shared RBGs.

3. The method of claim 2, wherein determining the sum of the shared number comprises:
determining indices of unshared RBGs allocated from the available RBGs to a further terminal device;
determining indices of unallocated RBGs from the available RBGs;
determining indices of the shared RBGs based on the number of the available RBGs, the indices of unshared RBGs allocated to the further terminal device and the indices of unallocated RBGs; and
determining the sum of shared number of the shared RBGs based on the indices of the shared RBGs.

4. The method of claim 1, wherein determining the offset value of the transmit power comprises:
determining the offset value of the power based on a ratio of the number of the shared RBGs to the sum of shared number of the shared RBGs.

5. The method of claim 1, further comprising:
performing communication with the plurality of the terminal devices at the target value of the transmit power.

6. A non-transitory computer readable medium comprising program instructions for causing an apparatus to perform at least the method of claim 1.

7. A network device for transmit power allocation in an MU MIMO system, comprising:
at least one processor; and
at least one memory including computer program code;
the at least one memory and the computer program code being configured to, with the at least one processor, cause the terminal device at least to:
allocating, at a network device, available resource block groups RBGs to a plurality of terminal devices;
determining a number of shared RBGs in the available RBGs, the shared RBGs being shared by the plurality of terminal devices;
determining a sum of the shared number of the shared RBGs per each of the plurality of terminal devices;
determining an average value of the transmit power base on the number of available RBGs and a total power of the network device, the average value indicating a basic power allocated by the network device to the plurality of terminal devices;
determining an offset value of the transmit power for each of the plurality of terminal devices based on the number of shared RBGs, the sum of the shared number and the average value; and
determining a target value of the transmit power for each of the plurality of terminal devices based on the offset value and the average value.

8. The network device of claim 7, wherein the network device is caused to determine the number of the shared RBGs by:
determining indices of unshared RBGs allocated from the available RBGs to a further terminal device;
determining indices of unallocated RBGs from the available RBGs;
determining indices of the shared RBGs based on the number of the available RBGs, the indices of unshared RBGs allocated to the further terminal device and the indices of unallocated RBGs; and
determining the number of the shared RBGs based on the indices of the shared RBGs.

9. The network device of claim 7, wherein the network device is caused to determine the sum of the shared number by:
determining indices of unshared RBGs allocated from the available RBGs to a further terminal device;
determining indices of unallocated RBGs from the available RBGs;
determining indices of the shared RBGs based on the number of the available RBGs, the indices of unshared RBGs allocated to the further terminal device and the indices of unallocated RBGs; and
determining the sum of shared number of the shared RBGs based on the indices of the shared RBGs.

10. The network device of claim 7, wherein the network device is caused to determine the offset value of the transmit power by
determining the offset value of the power based on a ratio of the number of the shared RBGs to the sum of shared number of the shared RBGs.

11. The network device of claim 7, wherein the network device is further caused to:
perform communication with the plurality of the terminal devices at the target value of the transmit power.

12. An apparatus for transmit power allocation in an MU MIMO system, comprising:
means for allocating, at a network device, available resource block groups RBGs to a plurality of terminal devices;
means for determining a number of shared RBGs in the available RBGs, the shared RBGs being shared by the plurality of terminal devices;
means for determining a sum of shared number of the shared RBGs per each of the plurality of terminal devices;
means for determining an average value of the transmit power base on the number of available RBGs and a total power of the network device, the average value indicating a basic power allocated by the network device to the plurality of terminal devices;
means for determining an offset value of the transmit power for each of the plurality of terminal devices based on the number of shared RBGs, the sum of the shared number and the average value; and
means for determining a target value of the transmit power for each of the plurality of terminal devices based on the offset value and the average value.

* * * * *